US010608508B2

(12) United States Patent
Lin et al.

(10) Patent No.: US 10,608,508 B2
(45) Date of Patent: Mar. 31, 2020

(54) SYSTEMS AND METHODS FOR EXCITERLESS SYNCHRONOUS MACHINES

(71) Applicant: ABB Schweiz AG, Baden (CH)

(72) Inventors: Chenjie Lin, Fuquay Varina, NC (US); Ghanshyam Shrestha, Apex, NC (US); Jing Xu, Cary, NC (US); Joonas Puukko, Raleigh, NC (US)

(73) Assignee: ABB Schweiz AG, Baden (CH)

( * ) Notice: Subject to any disclaimer, the term of this patent is extended or adjusted under 35 U.S.C. 154(b) by 434 days.

(21) Appl. No.: 15/718,568

(22) Filed: Sep. 28, 2017

(65) Prior Publication Data
US 2019/0097501 A1    Mar. 28, 2019

(51) Int. Cl.
| | | |
|---|---|---|
| H02K 11/042 | (2016.01) | |
| H02K 19/28 | (2006.01) | |
| H02K 19/12 | (2006.01) | |
| H02K 11/33 | (2016.01) | |
| H02K 3/20 | (2006.01) | |
| H02K 11/04 | (2016.01) | |

(52) U.S. Cl.
CPC .............. *H02K 11/042* (2013.01); *H02K 3/20* (2013.01); *H02K 11/044* (2013.01); *H02K 11/33* (2016.01); *H02K 19/12* (2013.01); *H02K 19/28* (2013.01)

(58) Field of Classification Search
CPC ........ H02K 11/042; H02K 11/33; H02K 3/20; H02K 11/044; H02K 19/12; H02K 19/28
USPC .................................................. 310/216.095
See application file for complete search history.

(56) References Cited

U.S. PATENT DOCUMENTS

| | | | |
|---|---|---|---|
| 2,333,538 A | 11/1943 | Liwschitz | |
| 3,938,029 A | 2/1976 | Wagner et al. | |
| 4,079,446 A | 3/1978 | Hertz | |
| 4,270,065 A | 5/1981 | Major | |
| 4,743,777 A | 5/1988 | Shilling | |

(Continued)

FOREIGN PATENT DOCUMENTS

| | | |
|---|---|---|
| EP | 2043255 A2 | 4/2009 |
| EP | 2728805 A2 | 5/2014 |

OTHER PUBLICATIONS

International Search Report and Written Opinion; PCT/US18/053338; ABB Schweiz AG; dated Dec. 11, 2018; 8 pgs.

(Continued)

*Primary Examiner* — Jue Zhang
*Assistant Examiner* — Bart Iliya
(74) *Attorney, Agent, or Firm* — Taft Stettinius & Hollister LLP; J. Bruce Schelkopf

(57) ABSTRACT

Unique systems, methods, techniques and apparatuses of an exciterless synchronous machine are disclosed. One exemplary embodiment is a salient pole rotor for an electric machine including one set of pole pairs including a first, second, and third pole pair; a field winding; a set of energy harvest windings, each winding mounted to each of the plurality of pole pairs and structured to receive a harmonic component of AC power from a stator; and a DC power supply structured to receive the harmonic component from the set of energy harvest windings, convert the harmonic component to DC power, and output the DC power to the field winding. The set of energy harvest windings are arranged in a first sequence on the first pole pair, a second sequence on the second pole pair, and a third sequence on the third pole pair, and each sequence is different.

20 Claims, 5 Drawing Sheets

(56) References Cited

U.S. PATENT DOCUMENTS

| | | | |
|---|---|---|---|
| 6,051,953 | A | 4/2000 | Vithayathil |
| 7,592,785 | B2 | 9/2009 | Kimura et al. |
| 7,787,913 | B2 | 8/2010 | Cornell |
| 7,982,326 | B2 | 7/2011 | Tan et al. |
| 2004/0199701 | A1 | 10/2004 | Eckmuller |
| 2005/0146226 | A1 | 7/2005 | Trainer et al. |
| 2008/0074910 | A1 | 3/2008 | Casteel et al. |
| 2009/0315329 | A1 | 12/2009 | Duffey et al. |
| 2010/0084941 | A1 | 4/2010 | Miyajima |
| 2011/0315496 | A1 | 12/2011 | Bohori et al. |
| 2013/0181568 | A1* | 7/2013 | Bangura ................ H02K 19/22 310/183 |
| 2014/0029318 | A1 | 1/2014 | Chen et al. |
| 2015/0263526 | A1 | 9/2015 | Kjaer et al. |
| 2016/0013744 | A1 | 1/2016 | McLean |
| 2016/0211787 | A1 | 7/2016 | Shrestha et al. |
| 2018/0034396 | A1* | 2/2018 | Shrestha ................ H02K 19/12 |
| 2018/0131301 | A1* | 5/2018 | Frampton ................ H02P 9/14 |
| 2018/0205299 | A1* | 7/2018 | Huang ................ H02K 15/028 |
| 2019/0173404 | A1* | 6/2019 | Rozman ................ H02K 11/33 |

OTHER PUBLICATIONS

International Search Report and Written Opinion; PCT/US2016/13826; ABB Technology AG; Apr. 1, 2016; 12 pgs.

* cited by examiner

SYSTEMS AND METHODS FOR EXCITERLESS SYNCHRONOUS MACHINES

BACKGROUND

The present disclosure relates generally to synchronous machines. In order to operate at synchronous speeds, some synchronous machines require an energized field winding incorporated into the machine rotor. Many synchronous machines use an external exciter unit to energize the field winding. Co-pending application Ser. No. 14/598,926 discloses unique synchronous machines including energy harvest windings, also known as energy harvesting coils, incorporated into the rotor to energize the field winding. The energy harvesting coils receive power in the form of intentional harmonics output by a machine drive controlling the synchronous machine. Existing synchronous machines suffer from a number of shortcomings and disadvantages. There remain unmet needs including reduced energy harvesting circuit complexity, reduced DC power supply circuit complexity, increased reliability, simplified rotor construction, reduced power losses in DC power supply, reduced total harmonic distortion. For instance, a field winding may require more power than a single energy harvesting coil can harvest, but adding more coils to each rotor pole pair increases the complexity of the harvesting circuit and the DC power supply circuit. The arrangement of the additional coils may not harvest the harmonic efficiently, increasing total harmonic distortion. There is a significant need for the unique apparatuses, methods, systems and techniques disclosed herein.

DISCLOSURE OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

SUMMARY

Exemplary embodiments include unique systems, methods, techniques and apparatuses for exciterless synchronous machines. Further embodiments, forms, objects, features, advantages, aspects and benefits of the disclosure shall become apparent from the following description and drawings.

DETAILED DESCRIPTION OF ILLUSTRATIVE EMBODIMENTS

Figure 1:
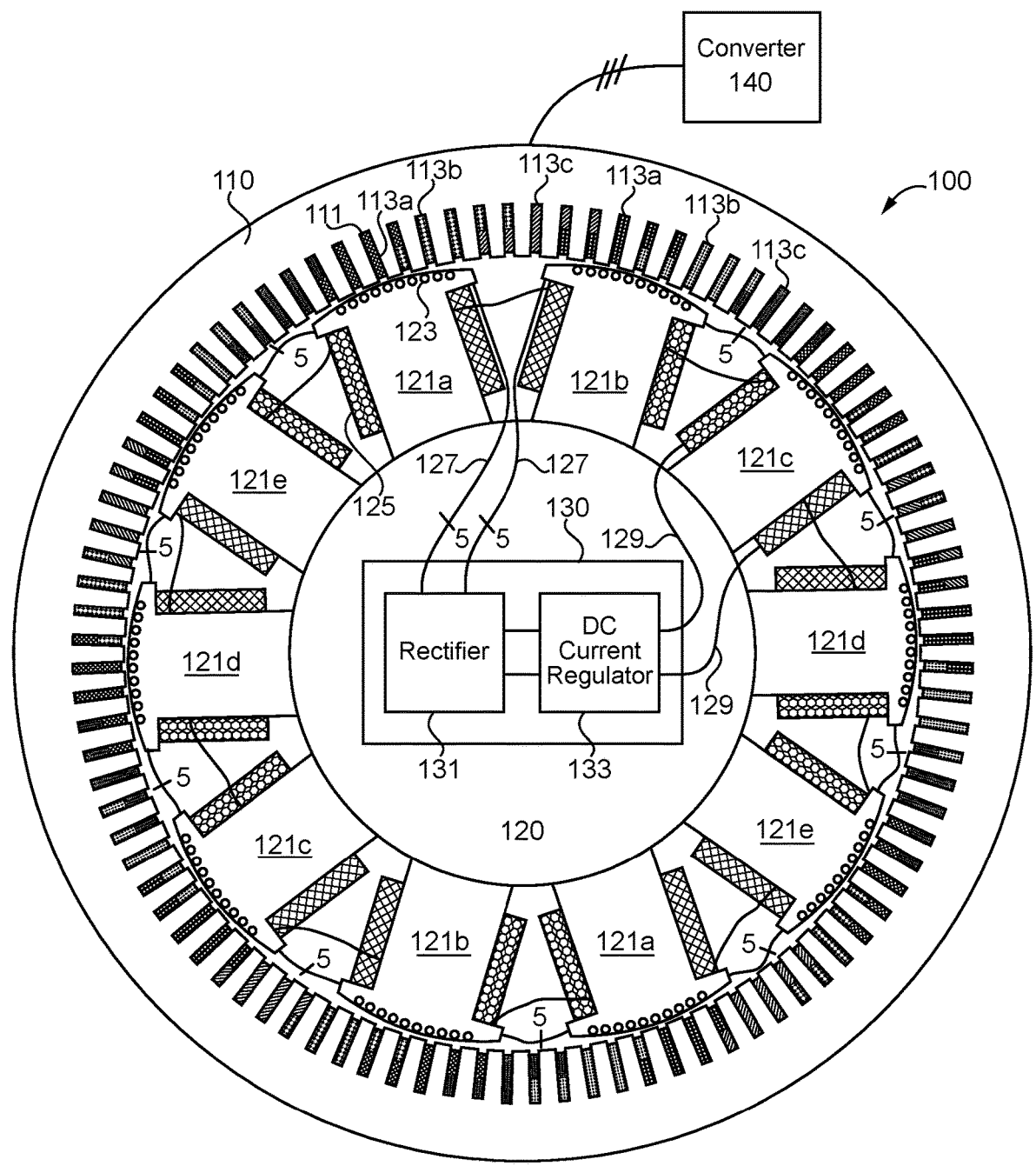
FIG. 1 illustrates an exemplary synchronous machine.

With reference to FIG. 1 there is illustrated a cross section of an exemplary synchronous machine 100 including a stator 110 and a rotor 120. It shall be appreciated that the arrangement of stator 110 and rotor 120 of machine 100 is illustrated for the purpose of explanation and is not intended as a limitation of the present disclosure. For example, rotor 120 may be implemented with any number of pole pairs greater than two pole pairs. Stator 110 may be implemented with more or less windings or winding slots. Since the number of stator slots 111 is not divided by the number of rotor pole pairs 121a-e is not an integer, the illustrated machine 100 is referred to as a fractional slot synchronous machine. In other embodiments, machine 100 is an integral slot synchronous machine. In other embodiments, rotor 120 houses stator 110. Furthermore, machine 100 may be operated in either a motor mode or a generator mode.

Stator 110 is provided in an annular form and includes a plurality of slots such as slot 111 distributed circumferentially about the stator and facing inwardly toward the interior of the stator annulus. Stator windings such as windings 113a-c are disposed or mounted within the plurality of slots 111 in a repeating pattern. The stator windings may be arranged in a non-uniform pattern, as illustrated in FIG. 1, or in a uniform pattern. Each of the set of stator windings is coupled to power converter 140 and structured to transfer alternating current (AC) power between the stator windings and power converter 140. The AC power transferred between the stator windings and converter 140 includes harmonic distortion. In certain embodiments, the harmonic distortion is a harmonic component actively injected by converter 140. In certain embodiments, the harmonic distortion is generated by normal operation of machine 100.

Rotor 120 is a salient pole rotor including one set of rotor pole pairs 121a-121e, a field winding 129, a set of multiphase energy harvest windings 127, and a direct current (DC) power supply 130. Each rotor pole pair includes two rotor poles located on opposite sides of rotor 120. In certain embodiments, rotor 120 is a non-salient structure, such as a cylindrical rotor. Unless specifically indicated to the contrary, reference to rotor structures such as poles, pole pairs, teeth, and slots shall be understood to be inclusive of both salient pole rotors and non-salient pole rotors such as cylindrical rotors.

The set of energy harvest windings 127 are structured to extract air gap harmonic power which is used for powering field winding 129. The use of energy harvest windings 127 eliminates the need for a separate exciter unit. The number of energy harvest windings is in part determined by the amount of air gap flux total harmonic distortion and the power demand of the field winding. In the illustrated embodiment, the power demand of field winding 129 requires more than a single phase energy harvest winding. In addition to powering the field winding, multiphase energy harvest windings may also reduce the impact of total harmonic distortion on the operation of a synchronous machine, since the windings are more distributed around the rotor compared to single phase excitation coils. As the discussed in more detail below, the number of energy harvest windings and the pattern of the energy harvest windings will dictate not only the maximum amount of harmonic distortion that can be extracted from the air gap, but also the complexity of the DC power supply 130.

The set of energy harvest windings 127, are operatively coupled, such as being mounted, to each rotor pole of rotor pole pairs 121a-e. In certain embodiments, the set of energy harvest windings are mounted to less than all rotor poles of rotor pole pairs 121a-e. In the illustrated embodiment, energy harvest windings 127 are disposed in slots, such as slot 123, on an outward surface of each rotor pole facing stator 110. Energy harvest windings 127 may be mounted to rotor 127 in other ways, such as electroplating or press mounting, to name but a few example.

For a fractional slot synchronous machine, the plurality of stator slots do not align with each rotor pole pair 121a-e in the same way. This offset causes an uneven flux distribution in the air gap between neighboring rotor poles, such as the rotor poles of pole pairs 121a and 121b. If the energy harvest windings of each pole pair were arranged in an identical pattern, this would cause an unequal induced voltage in one phase of the energy harvest windings at each pole pair, causing cancellation of the induced voltage and cancellation of total harmonic power for each winding. As discussed below, the exemplary pattern of energy harvest windings 127 causes a substantially equal induced voltage in one phase for all pole pairs, allowing power to be extracted from the air gap. It shall be appreciated that for an integral slot synchronous, the shifting pattern described below is implemented. Instead, the energy harvest windings are arranged in the same pattern for each pole pair.

DC power supply 130 is structured to receive power from the set of energy harvest windings 127, convert the received AC power to DC power, and output the DC power field winding 129. Specifically, DC power supply 130 includes a rectifier 131 coupled to the set of energy harvest windings 127 and a DC current regulator 133 coupled to field winding 129. In other embodiments, DC power supply includes additional components, such as active filters, passive filters, or energy storage devices to name but a few examples. In preferred embodiments, such as the illustrated embodiment, the energy harvest windings 127 are mounted to each rotor pole pair, as opposed to each pole pair having a separate set of multiphase energy harvest windings connected to a rectifier. The exemplary pattern of energy harvest windings reduces the size of the rectifier, allowing for reduced complexity of DC power supply 130. It shall be appreciated that that topologies of DC power supply 130, including rectifier 131 and DC current regulator 133 may be any topology structured to transfer power from the energy harvest windings to the field winding.

Field winding 127 is wrapped around each rotor pole and coupled to DC power supply 130. Field winding 127 is structured to generate a magnetic field using the DC power from DC power supply 130. It shall be appreciated that any or all of the foregoing features of machine 100 may also be present in the other synchronous machines disclosed herein.

Figure 2:
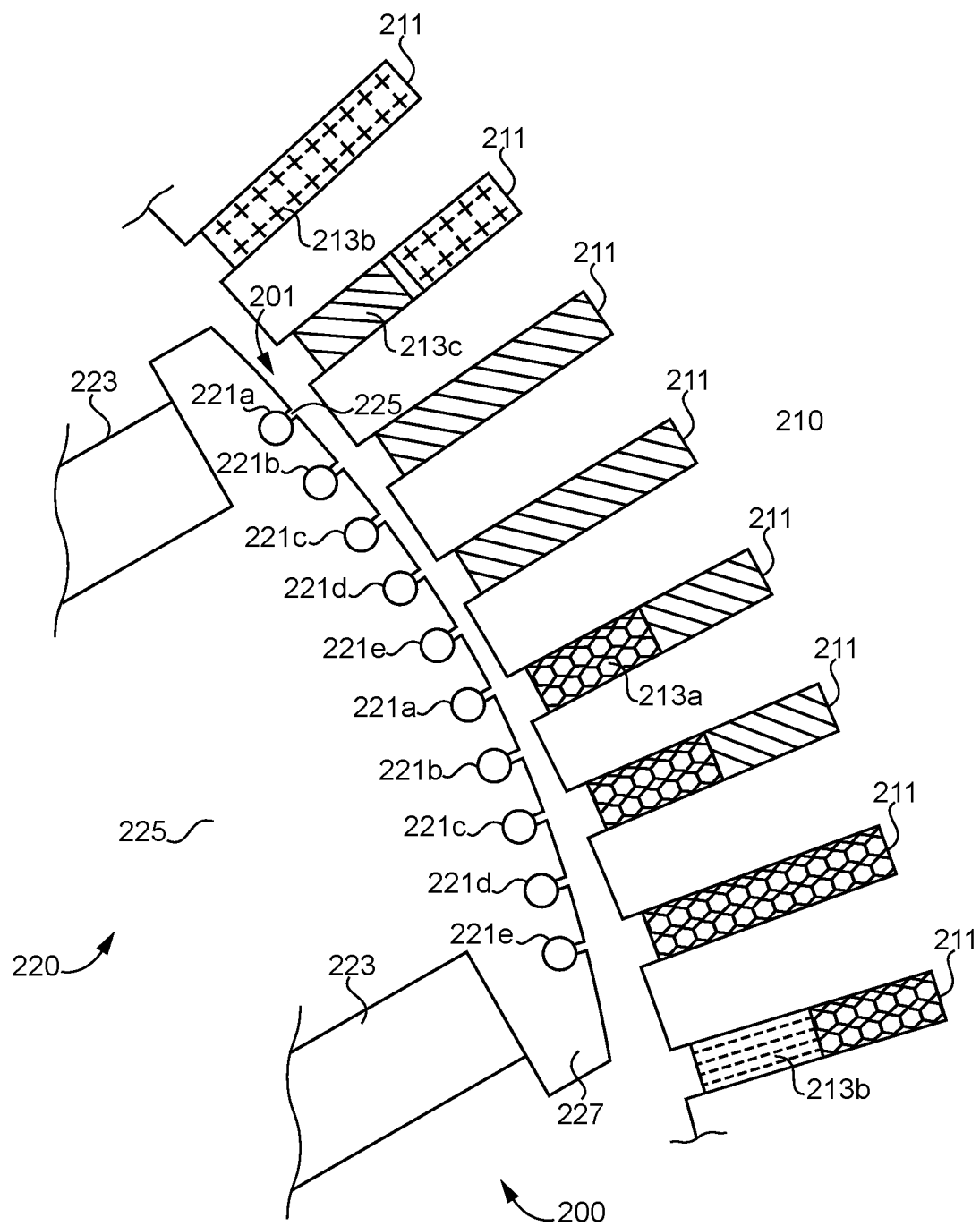
FIG. 2 illustrates a portion of an exemplary synchronous machine.

With reference to FIG. 2 there is illustrated a portion of a cross section of an exemplary synchronous machine 200, such as machine 100 in FIG. 1. Machine 200 includes stator 210 and rotor pole 220. Stator 210 includes a plurality of slots 211 and a set of stator windings 213a-c. Each slot 211 may include more than one stator winding.

Rotor pole 220 includes a core 225 around which a field winding 223 is wound. Rotor pole 200 also includes a shoe 227 forming an air gap 201 between stator 210 and rotor pole 220. On the outward surface of shoe 227 facing stator 210, there are a plurality of slots 225. In the illustrated embodiment, the slots are equally spaced. In other embodiments, the slots may be arranged evenly across the outward surface of shoe 227, or unevenly spaced across the outward surface shoe 227.

Rotor 220 includes a set of multiphase energy harvest windings 221a-221e disposed in the slots of rotor 220, arranged in a repeating pattern, the pattern comprising an order or sequence of winding phases across an outer surface of a rotor pole from a cross section perspective of the rotor pole. In the illustrated embodiment, the set of multiphase energy harvest windings 221a-221e has five phases, with winding 221a being the first phase, winding 221b being the second phase, winding 221c being the third phase, winding 221d being the fourth phase, and winding 221e being the fifth phase.

Figure 3:
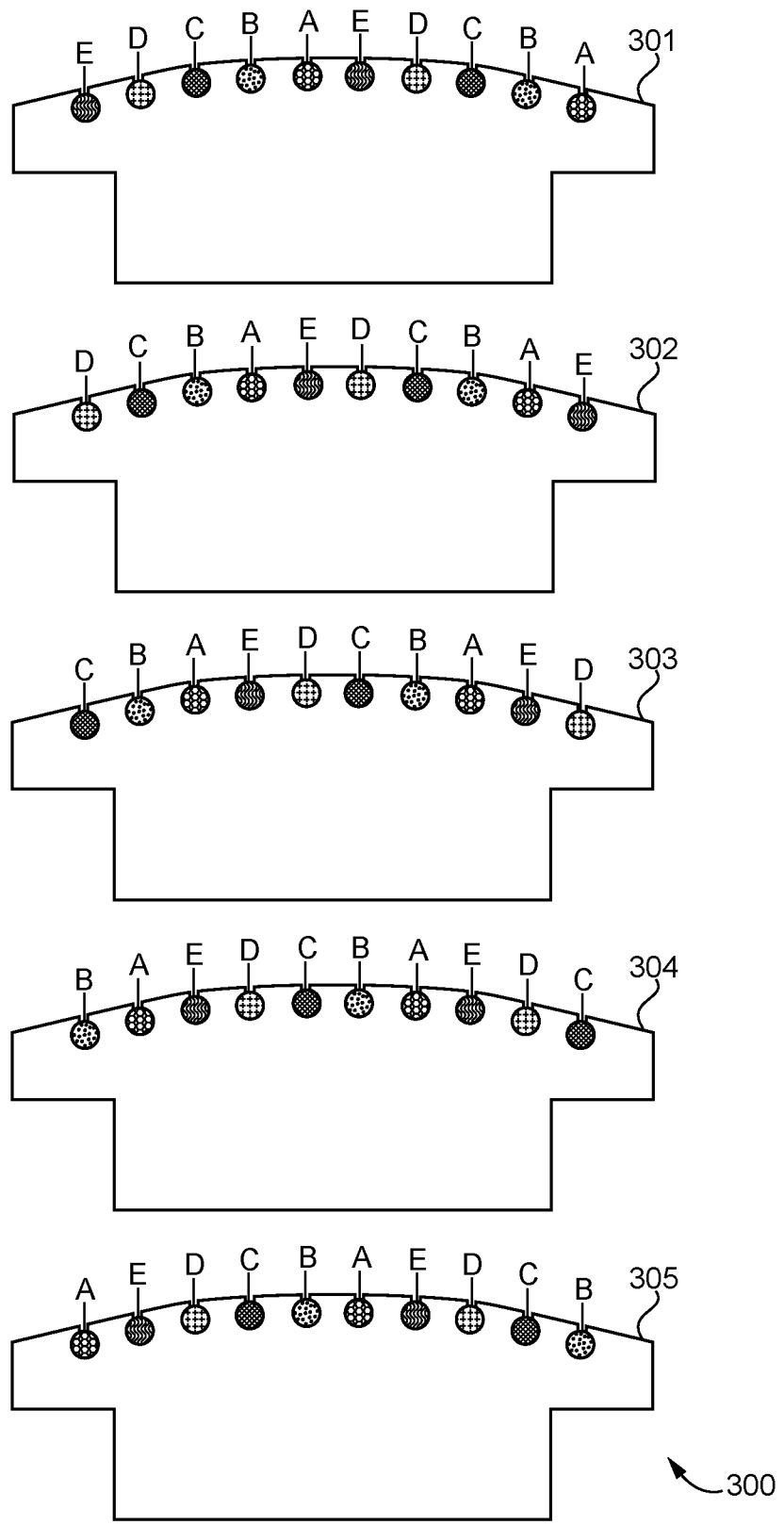
FIG. 3 illustrates a multiphase energy harvest winding arrangement.

With reference to FIG. 3 there are cross sections of a set of rotor poles 300 illustrating an exemplary energy harvest winding pattern for machine 100 of FIG. 1. The set of rotor poles 300 includes pole 301 representing one pole of rotor pole pair 121a in FIG. 1, pole 302 representing one pole of rotor pole pair 121b in FIG. 1, pole 303 representing one pole of rotor pole pair 121c in FIG. 1, pole 304 representing one pole of rotor pole pair 121d in FIG. 1, and pole 305 representing one pole of rotor pole pair 121e in FIG. 1.

The energy harvest windings of pole 301 are arranged in the following pattern from right to left: Phase A, Phase B, Phase C, Phase D, Phase E, Phase A, Phase B, Phase C, Phase D, and Phase E. In certain embodiments, the pattern of windings of pole 301 is arbitrary. It can be observed that the pattern of energy harvest windings for each of poles 302-305 is a cyclic permutation of the pattern of pole 301. Specifically, the pattern of energy harvest windings of pole 302 is a one position circular shift, also known as a bitwise shift, of the pattern of energy harvest windings of pole 301. Furthermore, the pattern of energy harvest windings of pole 303 is a one position circular shift of the pattern of energy harvest windings of pole 302, the pattern of energy harvest windings of pole 304 is a one position circular shift of the pattern of energy harvest windings of pole 303, and the pattern of energy harvest windings of pole 305 is a one position circular shift of the pattern of energy harvest windings of pole 304.

As discussed above, the pattern of the energy harvest windings must compensate for the offset of stator slots relative to each rotor pole pair such that each energy harvest windings are in the same position on each pole pair relative to the stator teeth. The following equation expresses the pattern in vector format where p represents the vector of each phase of the excitation coil, m represents the index number of the rotor pole pair, n represents the index number of the phase in each pole pair:

$$p(m,n)=e^{j(m*Pole\_mechanical\_spacing+n*Coil\_phase\_shift)} \quad (1)$$

Pole_mechanical spacing is equal to the angular spacing between each rotor pole, and Coil_phase_shift is equal to the electrical phase shift between each energy harvest winding location, as expressed by the following equations where m_deg represents the angle displacement about a cross section of the electric machine and e_deg represents the electrical phase shift on one rotor pole:

$$Pole\_mechanical\_spacing=360^{m\_deg}/Max(m) \quad (2)$$

$$Coil\_phase\_shift=360^{e\_deg}/Max(n) \quad (3)$$

In order for the energy harvest windings to span across multiple rotor pole pairs, the vectors corresponding to one phase must overlap for all rotor pole pairs. Implementation of equations (1)-(3) causes the energy harvest windings to be arranged in a pattern which keeps the same order but shifts according to the particular pole pair.

Since the energy harvest windings coupled to more than one rotor pair harvest energy when the phase vectors overlap for each pole pair, the maximum number of phases of energy harvest windings should be limited to the number of rotor pole pairs. For example, the pattern of the energy harvest windings in rotor pole 301 is shifted once for rotor pole 302. The pattern is then shifted once again for rotor pole 303, then again for pole 304, and then again for pole 305. The pattern completes one cycle since pole 301 neighbors pole 305 and a shift of the pattern in 305 is the same at the original pattern in pole 301. The pattern completes one cycle by shifting five times. Thus, the maximum number of phases of energy harvest windings is five, the same as the number of rotor pole pairs. In certain embodiments, the number of phases of energy harvest windings may be less than the maximum number of phases of energy harvest windings and the pattern of energy harvest windings is arranged in a shifting pattern with the windings separated by unequal spacing.

One exception to the 1:1 ratio of pole pairs to energy harvest windings phases is where there are six pole pairs. Since the cycle of stator windings offset occurs twice per rotation of the electric machine, the ideal number of phases of energy harvest windings is three, half the number of rotor pole pairs. In other embodiments, a maximum of six energy harvest windings may be used when a rotor includes six rotor pole pairs.

Figure 4A:
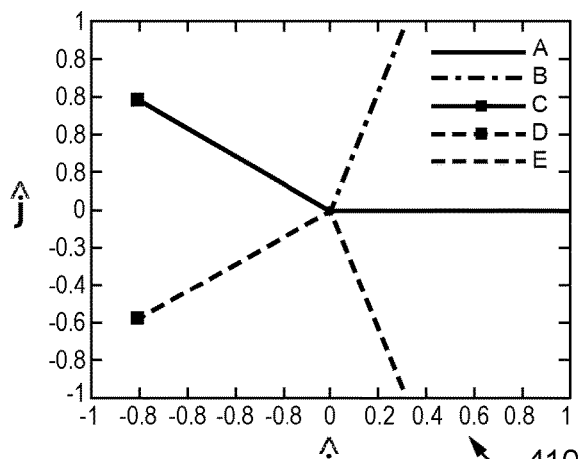
FIGS. 4A-4E are graphs illustrating an exemplary energy harvest winding pattern computation.
Figure 4B:
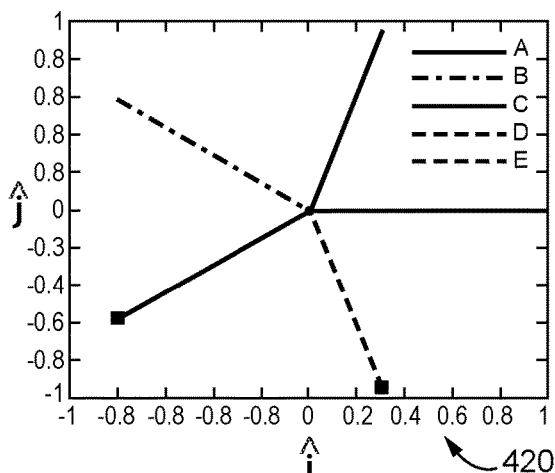
Figure 4C:
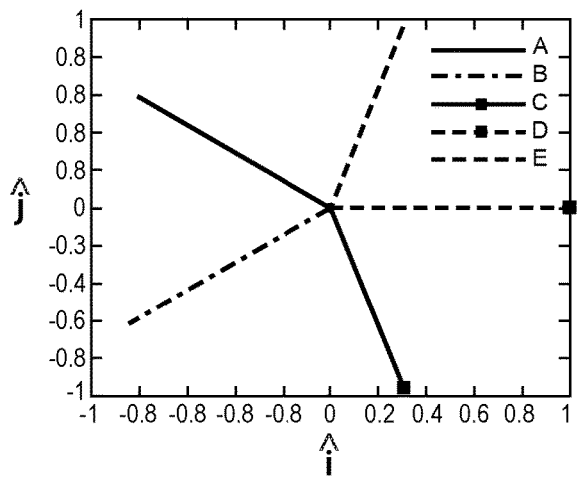
Figure 4D:
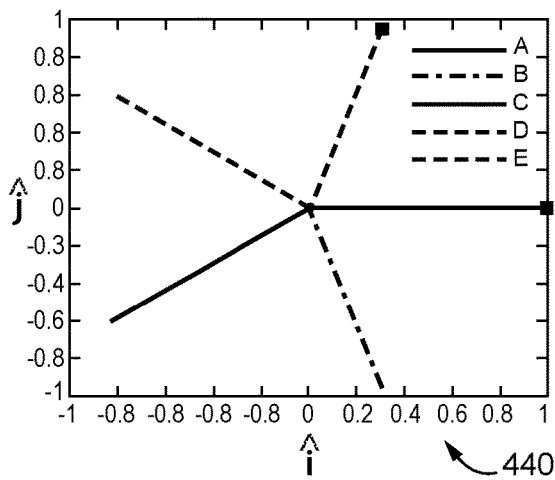
Figure 4E:
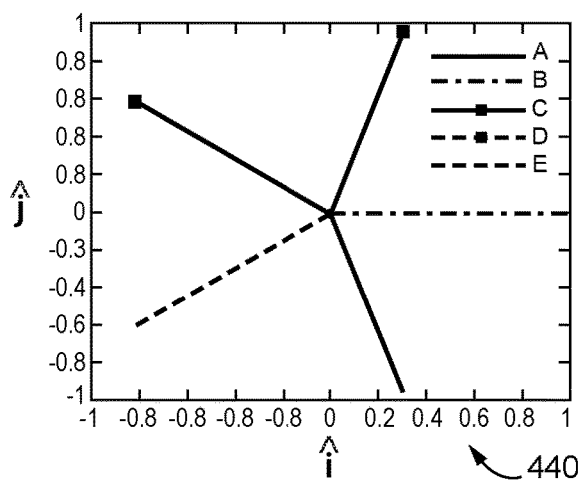

With reference to FIGS. 4A-4E there is a graph illustrating a set of vectors corresponding to the electric phase shifts caused by the circular shift of energy harvest windings illustrated in FIG. 3. FIG. 4A illustrates each phase of the energy harvest windings of pole 301. FIGS. 4B-4E illustrate the electrical phase shifts caused by the circular shifting patterns of energy harvest windings in poles 302-305, respectively, relative to pole 301. It is important to note the electrical phase shifts in each pole is equal to the orientation of each pole relative to the first pole. For example, the angle between pole pairs 121a and 121b is 72 degrees and the electrical shift caused by the patterns of energy harvest windings, as shown by FIGS. 4A and 4B, is also 72 degrees. Since the angle between the pole pairs is offset by the pattern of energy harvest windings, the induced voltage in each phase of the energy harvest windings will be substantially the same.

Figure 5:
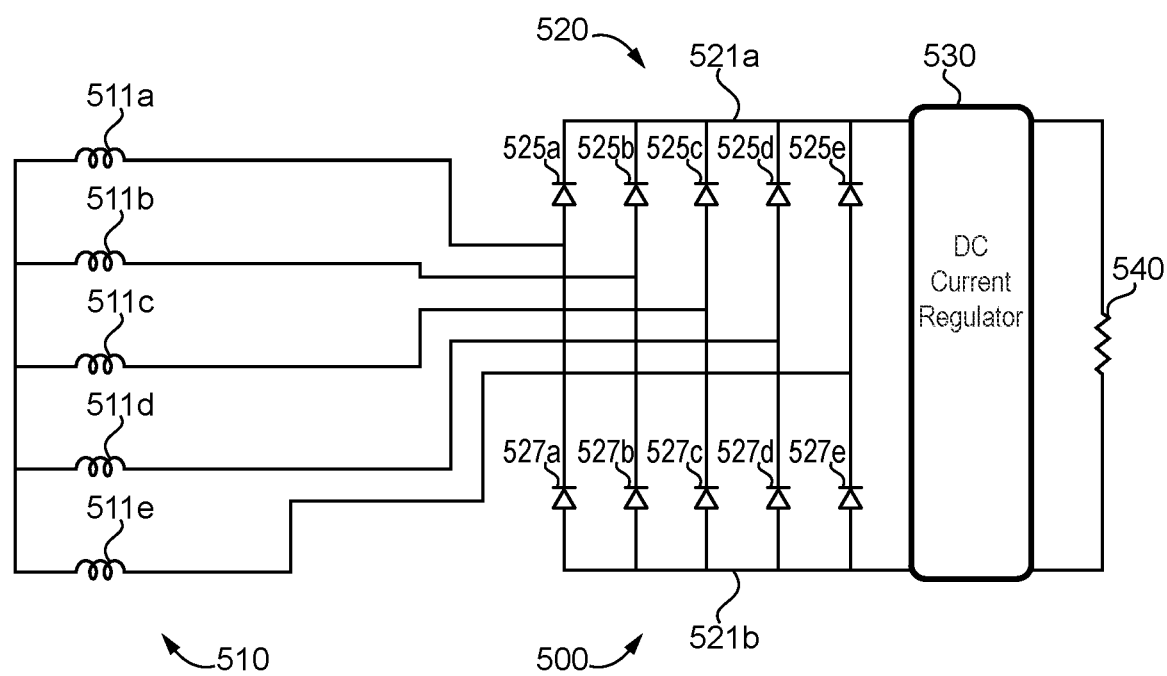
FIG. 5 illustrates an exemplary rotor circuit.

With reference to FIG. 5 there is illustrated an exemplary energy harvesting circuit 500 for machine 100 in FIG. 1. Circuit 500 includes a set of energy harvest windings 510 coupled together at a common, concentrated node and also coupled individually coupled to rectifier 520. In other embodiments, the set of energy harvest windings 510 are coupled together in a zig-zag configuration instead of coupled at a common node. The set of energy harvest windings 510 include windings 511a-e.

Rectifier 520 includes one leg for each of windings 511a-e. Each leg is coupled between DC rails 521a, 521b. Each leg includes two series coupled semiconductor devices connected at a midpoint connection. For example, one leg includes semiconductor devices 525a and 527a, one leg includes semiconductor devices 525b and 527b, one leg includes semiconductor devices 525c and 527c, one leg includes semiconductor devices 525d and 527d, and one leg includes semiconductor devices 525e and 527e. Each energy harvest winding is coupled to one leg of rectifier 520 by way of a midpoint connection. In the illustrated embodiment, the semiconductor devices of rectifier 520 are diodes. In other embodiments, some of the semiconductor devices may be semiconductor switches.

Power received with windings 511a-511e is rectified with rectifier 520 and transmitted to DC current regulator 530 by way of rails 521a, 521b. DC current regulator 530 is structured to receive the DC power from rectifier 520, increase or decrease the current of the received power according to a prescribed current level in a field winding 540, and output the power to field winding 540.

Further written description of a number of exemplary embodiments shall now be provided. One embodiment is a synchronous electric machine comprising a stator including a plurality of stator windings structured to receive alternating current (AC) power from a power converter including a harmonic component; and a rotor including one set of pole pairs, each pole pair including two rotor poles, each rotor pole of the set of pole pairs including an outer surface separated from the stator by an air gap, a field winding, a set of multiphase energy harvest windings, each energy harvest winding being operatively coupled to the outer surface of at least two pole pairs of the set of pole pairs and structured to receive the harmonic component from the stator windings, and a DC power supply structured to receive power from the set of multiphase energy harvest windings, convert the power to DC power, and output the DC power to the field winding, wherein the number of phases in the set of multiphase energy harvest windings is equal to the number of pole pairs in the set of pole pairs except where the number of pole pairs is six, wherein the number of phases in the set of multiphase energy harvest windings is three when the number of pole pairs in the set of pole pairs is six, and wherein the set of pole pairs includes a first pole pair and a second pole pair.

In certain forms of the foregoing machine, the outer surface of each rotor pole includes a plurality slots, wherein one phase of the set of multiphase energy harvest windings is disposed in each slot of the plurality of slots. In certain forms, a pattern of the energy harvest windings for each pole pair is a cyclic permutation of the pattern of energy harvest windings operatively coupled to the first pole pair of the set of pole pairs. In certain forms, the patterns of the energy harvest windings for each pole pair is a circular shifting pattern configured to compensate for an offset between the position of each rotor pole relative to the stator windings. In certain forms, the energy harvest windings are coupled together at a common node and are each coupled to a rectifier. In certain forms, the rectifier includes one leg for each phase of the energy harvest windings, each leg including two semiconductor devices coupled at a midpoint connection, wherein each phase of the energy harvest windings is coupled to one of the midpoints connections. In certain forms, the set of multiphase energy harvest windings are operatively coupled to the outer surface of all pole pairs of the set of pole pairs.

Another exemplary embodiment is a rotor for an electric machine comprising one set of pole pairs including a first pole pair, a second pole pair, and a third pole pair; a field winding; a set of multiphase energy harvest windings, each winding operatively coupled to the set of pole pairs and structured to receive a harmonic component of AC power from a stator; and a DC power supply structured to receive the harmonic component from the set of energy harvest windings, convert the harmonic component to DC power, and output the DC power to the field winding, wherein the set of energy harvest windings are arranged in a first sequence on the first pole pair, a second sequence on the second pole pair, and a third sequence on the third pole pair, and wherein the first sequence, the second sequence, and the third sequence are different.

In certain forms of the foregoing rotor, the number of windings in the set of the energy harvest windings is equal to the number of pole pairs in the set of pole pairs. In certain forms, the number of pole pairs in the set of pole pairs is six and the number of windings in the set of the energy harvest windings is three. In certain forms, the second sequence is the first sequence subjected to a one position circular shift and wherein the third position is the first sequence subjected to a two position circular shift. In certain forms, the DC power supply includes a rectifier coupled the set of energy harvest windings and a DC current regulator coupled to an output of the rectifier, wherein the rectifier includes one leg coupled to each windings of the set of energy harvest windings, each leg including two semiconductor devices coupled at a midpoint connection. In certain forms, the windings of the set of energy harvest windings are coupled together in a concentrated configuration. In certain forms, the rotor is structured to be housed inside the stator.

A further exemplary embodiment is a method for constructing a rotor of a synchronous machine including one set of pole pairs, the method comprising mounting a field winding to the rotor; mounting a set of multiphase energy harvest windings to the rotor such that each winding of the multiphase energy harvest windings is mounted to more than one pole pair of the set of pole pairs; and mounting a DC power supply to the rotor, the DC power supply including a rectifier coupled to the set of multiphase energy harvest windings and a DC power supply output coupled to the field winding, wherein the set of multiphase energy harvest windings are arranged in a shifting sequence on each of the pole pairs of the set of pole pairs.

In certain forms of the foregoing method, the number of energy harvest windings is equal to the number of pole pairs. In certain forms, the number of energy harvest windings is three and the number of pole pairs is six. In certain forms, the sequence of the energy harvest windings on each of the pole pairs is a cyclical shift of another sequence of the energy harvest windings on another pole pair. In certain forms, each rotor pole of the pole pairs includes a core and a shoe coupled to the core, and wherein mounting field winding to the rotor includes wrapping the field winding around the core of each rotor pole of the rotor. In certain forms, mounting the set of multiphase energy harvest windings to the rotor includes mounting the set of multiphase energy harvest windings to an outward facing surface of the shoe in equally spaced slots disposed in the shoe.

It is contemplated that the various aspects, features, processes, and operations from the various embodiments may be used in any of the other embodiments unless expressly stated to the contrary. Certain operations illustrated may be implemented by a computer executing a computer program product on a non-transient computer readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described and that all changes and modifications that come within the spirit of the present disclosure are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with or a connection to another item as well as a belonging to or a connection with the other item as informed by the context in which it is used. The terms "coupled to," "coupled with" and the like include indirect connection and coupling and further include but do not require a direct coupling or connection unless expressly indicated to the contrary. When the language "at least a portion" and/or "a portion" is used the item can include a portion and/or the entire item unless specifically stated to the contrary.

What is claimed is:

1. A synchronous electric machine comprising:
   a stator including a plurality of stator windings structured to receive alternating current (AC) power from a power converter including a harmonic component; and
   a rotor including:
      one set of pole pairs, each pole pair including two rotor poles, each rotor pole of the set of pole pairs including an outer surface separated from the stator by an air gap,
      a field winding,
      a set of multiphase energy harvest windings, each energy harvest winding being operatively coupled to the outer surface of at least two pole pairs of the set of pole pairs and structured to receive the harmonic component from the stator windings, and
      a direct current (DC) power supply structured to receive power from the set of multiphase energy harvest windings, convert the power to DC power, and output the DC power to the field winding,
   wherein the number of phases in the set of multiphase energy harvest windings is equal to the number of pole pairs in the set of pole pairs except where the number of pole pairs is six,
   wherein the number of phases in the set of multiphase energy harvest windings is three when the number of pole pairs in the set of pole pairs is six, and
   wherein the set of pole pairs includes a first pole pair and a second pole pair.

2. The machine of claim 1 wherein the outer surface of each rotor pole includes a plurality slots, wherein one phase of the set of multiphase energy harvest windings is disposed in each slot of the plurality of slots.

3. The machine of claim 1 wherein a pattern of the energy harvest windings for each pole pair is a cyclic permutation of the pattern of energy harvest windings operatively coupled to the first pole pair of the set of pole pairs.

4. The machine of claim 3 wherein the patterns of the energy harvest windings for each pole pair is a circular shifting pattern configured to compensate for an offset between the position of each rotor pole relative to the stator windings.

5. The machine of claim 1 wherein the energy harvest windings are coupled together at a common node and are each coupled to a rectifier.

6. The machine of claim 5 wherein the rectifier includes one leg for each phase of the energy harvest windings, each leg including two semiconductor devices coupled at a midpoint connection, wherein each phase of the energy harvest windings is coupled to one of the midpoints connections.

7. The machine of claim 1 wherein the set of multiphase energy harvest windings are operatively coupled to the outer surface of all pole pairs of the set of pole pairs.

8. A rotor for an electric machine comprising:
    one set of pole pairs including a first pole pair, a second pole pair, and a third pole pair;
    a field winding;
    a set of multiphase energy harvest windings, each winding operatively coupled to the set of pole pairs and structured to receive a harmonic component of AC power from a stator; and
    a DC power supply structured to receive the harmonic component from the set of energy harvest windings, convert the harmonic component to DC power, and output the DC power to the field winding,
    wherein the set of energy harvest windings are arranged in a first sequence on the first pole pair, a second sequence on the second pole pair, and a third sequence on the third pole pair, and
    wherein the first sequence, the second sequence, and the third sequence are different.

9. The rotor of claim 8 wherein the number of windings in the set of the energy harvest windings is equal to the number of pole pairs in the set of pole pairs.

10. The rotor of claim 8 wherein the number of pole pairs in the set of pole pairs is six and the number of windings in the set of the energy harvest windings is three.

11. The rotor of claim 8 wherein the second sequence is the first sequence subjected to a one position circular shift and wherein the third position is the first sequence subjected to a two position circular shift.

12. The rotor of claim 8 wherein the DC power supply includes a rectifier coupled the set of energy harvest windings and a DC current regulator coupled to an output of the rectifier, wherein the rectifier includes one leg coupled to each windings of the set of energy harvest windings, each leg including two semiconductor devices coupled at a midpoint connection.

13. The rotor of claim 8 wherein the windings of the set of energy harvest windings are coupled together in a concentrated configuration.

14. The rotor of claim 8 wherein the rotor is structured to be housed inside the stator.

15. A method for constructing a rotor of a synchronous machine including one set of pole pairs, the method comprising:
    mounting a field winding to the rotor;
    mounting a set of multiphase energy harvest windings to the rotor such that each winding of the multiphase energy harvest windings is mounted to more than one pole pair of the set of pole pairs; and
    mounting a DC power supply to the rotor, the DC power supply including a rectifier coupled to the set of multiphase energy harvest windings and a DC power supply output coupled to the field winding,
    wherein the set of multiphase energy harvest windings are arranged in a shifting sequence on each of the pole pairs of the set of pole pairs.

16. The method of claim 15 wherein the number of energy harvest windings is equal to the number of pole pairs.

17. The method of claim 15 wherein the number of energy harvest windings is three and the number of pole pairs is six.

18. The method of claim 15 wherein the sequence of the energy harvest windings on each of the pole pairs is a cyclical shift of another sequence of the energy harvest windings on another pole pair.

19. The method of claim 15 wherein each rotor pole of the pole pairs includes a core and a shoe coupled to the core, and wherein mounting field winding to the rotor includes wrapping the field winding around the core of each rotor pole of the rotor.

20. The method of claim 19 wherein mounting the set of multiphase energy harvest windings to the rotor includes mounting the set of multiphase energy harvest windings to an outward facing surface of the shoe in equally spaced slots disposed in the shoe.

\* \* \* \* \*